Oct. 19, 1965    P. L. JOHNSON    3,212,596
COLLAPSIBLE MOTOR SCOOTER
Filed Nov. 26, 1962    3 Sheets-Sheet 1
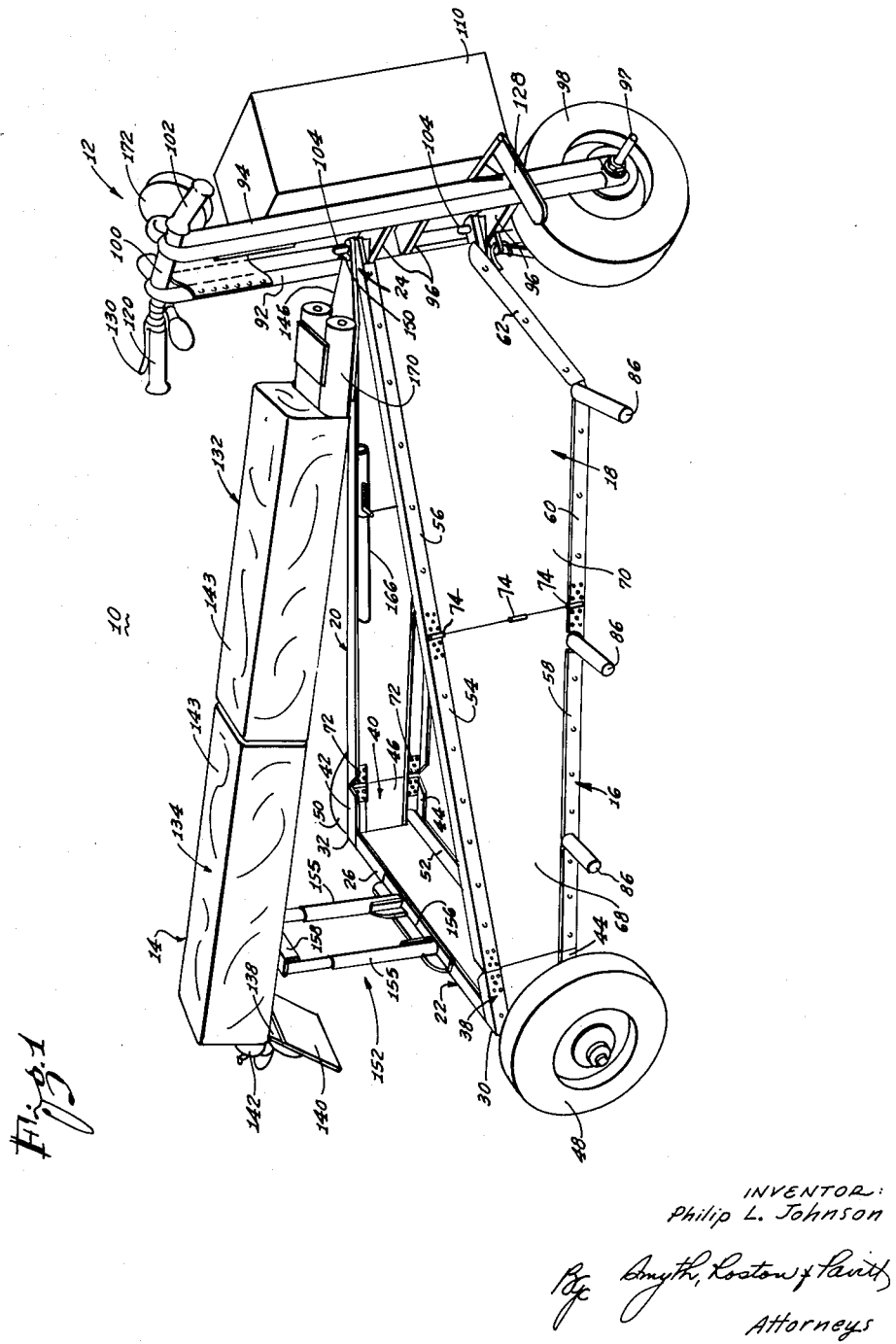
INVENTOR:
Philip L. Johnson
Smyth, Roston & Pavitt
Attorneys

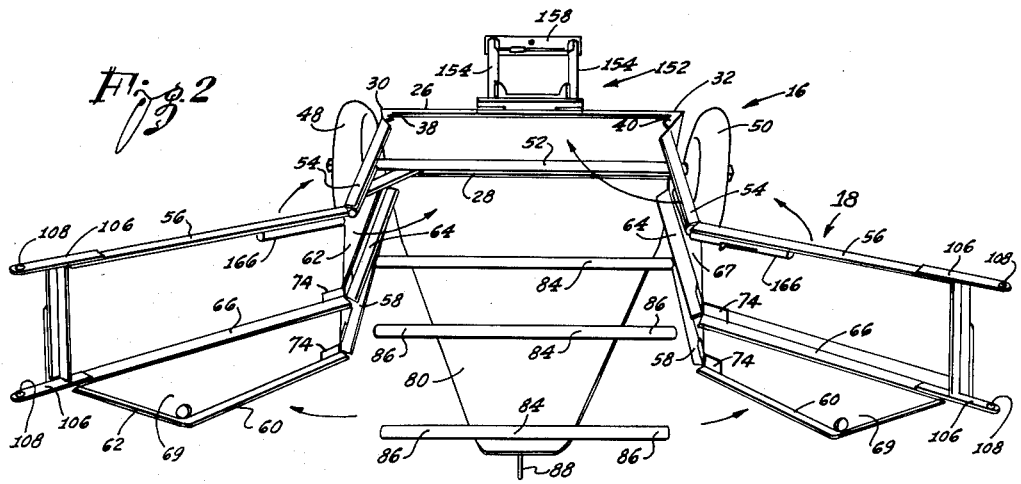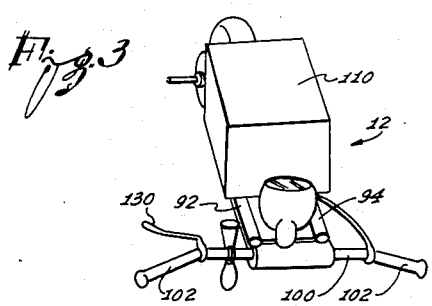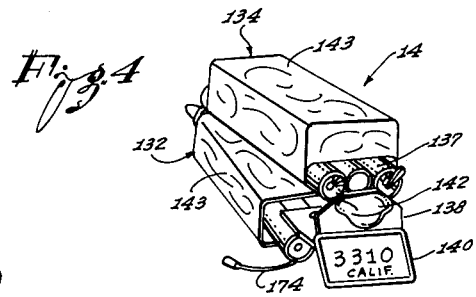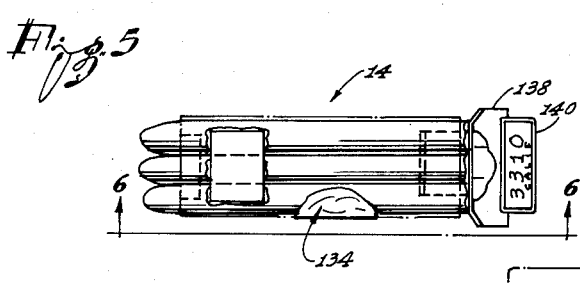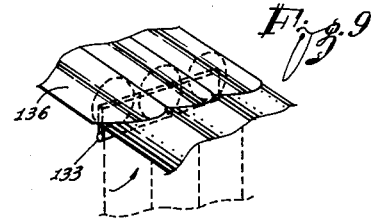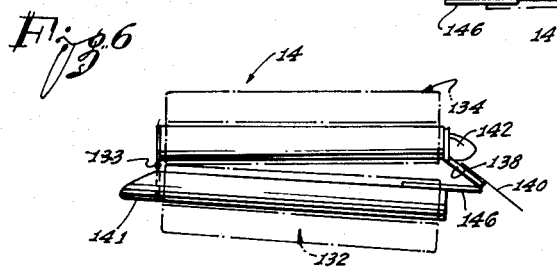
INVENTOR:
Philip L. Johnson
Attorneys Oct. 19, 1965  P. L. JOHNSON  3,212,596
COLLAPSIBLE MOTOR SCOOTER
Filed Nov. 26, 1962  3 Sheets-Sheet 3
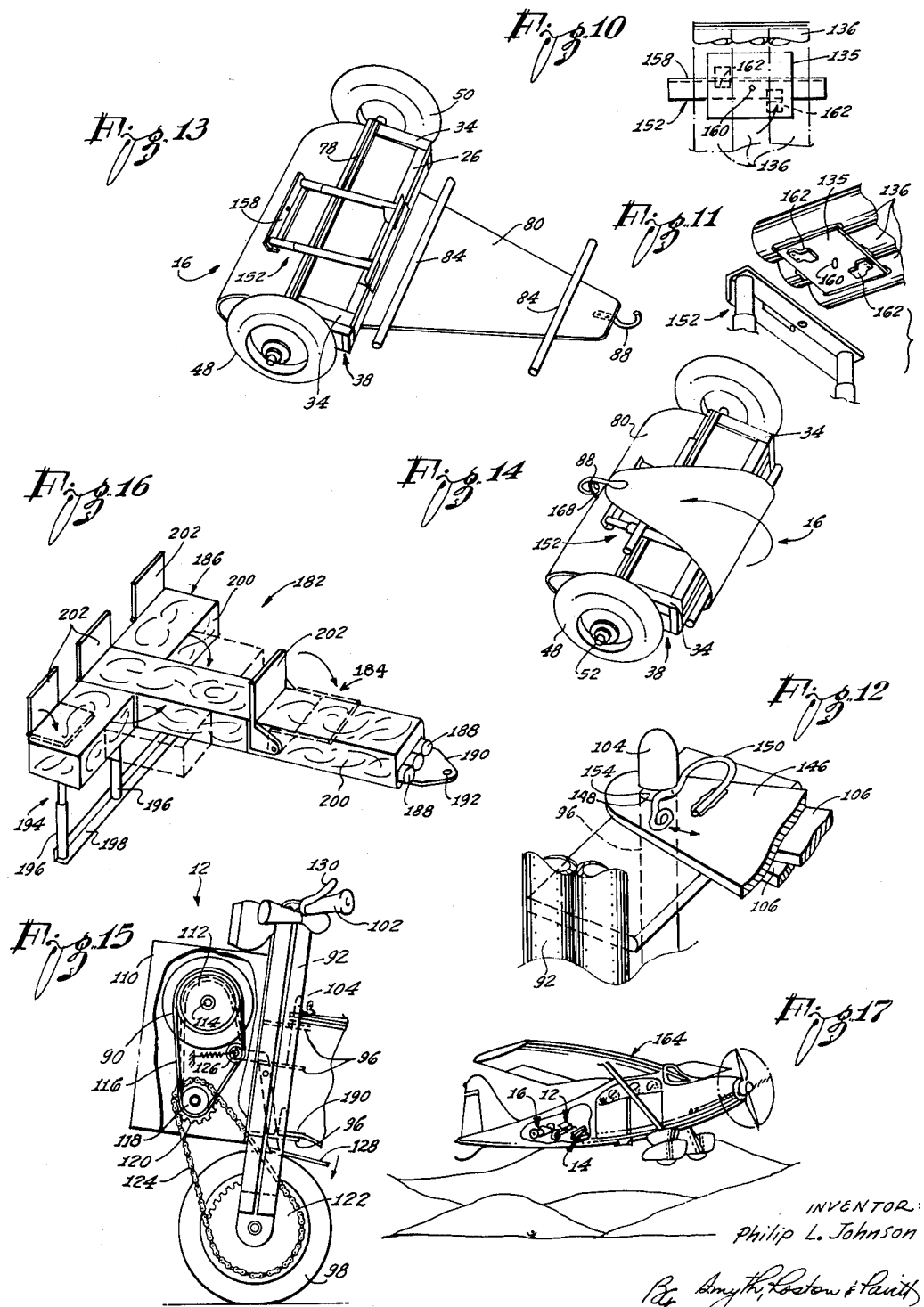
INVENTOR:
Philip L. Johnson
By Smyth, Roston & Pavitt
Attorneys

United States Patent Office 3,212,596
Patented Oct. 19, 1965

3,212,596
COLLAPSIBLE MOTOR SCOOTER
Philip L. Johnson, 9710 Ocean Gate Ave.,
Inglewood, Calif.
Filed Nov. 26, 1962, Ser. No. 239,922
5 Claims. (Cl. 180—26)

The present invention relates to motor vehicles, and more particularly to motor scooters which may be collapsed into small, compact packages for storage and/or transportation.

At the present time, there are a wide variety of so-called motor scooters that are useful for travelling from one location to another. Although such vehicles are particularly well suited for travelling relatively short distances, they are generally of very limited capacity and speed and, as a consequence, are not well suited for long distance travel. It is, therefore, very frequently desirable to employ a high speed vehicle such as an airplane, automobile and/or boat for travelling long distances and at the same time carry a motor scooter for local travel after arriving at the destination. Heretofore, motor scooters have not been well suited for such use as they have been bulky and difficult to handle as well as being inconvenient to store or transport in another vehicle. Although it has been proposed to overcome this difficulty by providing collapsible motor scooters, such motor scooters have been of the two-wheel variety and have been too small and of too limited capacity. Moreover, they have been inconvenient and difficult to assemble or disassemble and/or they have been unsuitable for providing the required amount of transportation.

It is now proposed to provide a vehicle which will overcome the foregoing difficulties. More particularly, it is proposed to provide a vehicle which may be readily disassembled for storage or assembled for use and when fully assembled will be convenient and easy to use and will provide a motor vehicle having an adequate capacity to very effectively transport a useful load. This is to be accomplished by providing a vehicle consisting of a plurality of separate sections that may be readily dismantled without any tools. Each of the sections, when dismantled will be small, lightweight units that may be easily handled and/or stored. In addition, the separate sections may be readily assembled into a complete and operative vehicle with a minimum amount of time and effort and without the use of any tools. When fully assembled, the resultant motor vehicle may have three wheels so as to be self-supporting and capable of carrying a substantial number of persons and/or loads.

These and other features and advantages of the present invention will become readily apparent to a person skilled in the art from reading the following detailed description of a limited number of embodiments thereof, particularly when taken in connection with the accompanying drawings wherein like reference numerals refer to like parts, and wherein:

FIGURE 1 is a perspective view of a vehicle embodying one form of the present invention;

FIGURE 2 is a front view of the body unit of the vehicle of FIGURE 1 in a partially dismantled condition;

FIGURE 3 is a perspective view of the power unit of the vehicle of FIGURE 1 in a dismantled condition;

FIGURE 4 is a perspective view of the seat unit of the vehicle in a dismantled condition;

FIGURE 5 is a plan view of the seat unit of FIGURE 4 in a dismantled condition;

FIGURE 6 is a side view of the seat unit taken substantially along the plan of line 6—6 of FIGURE 5;

FIGURE 7 is a view of the seat unit in a partially assembled condition;

FIGURE 8 is a transverse cross-sectional view of the seat unit taken substantially along the plan of line 8—8 of FIGURE 7;

FIGURE 9 is a fragmentary perspective view of the seat unit;

FIGURE 10 is a fragmentary view of a portion of the seat unit showing the connection of the seat portion to the body unit;

FIGURE 11 is a fragmentary perspective view of the same part of the seat unit as shown in FIGURE 10;

FIGURE 12 is a fragmentary perspective view of the front of the seat unit and the means for securing the power unit to the body unit;

FIGURE 13 is a perspective view of the body unit of FIGURE 2 in a partially stored condition;

FIGURE 14 is a perspective view similar to FIGURE 12 but showing the body unit in a fully stored condition;

FIGURE 15 is a side elevational view of the power unit of the vehicle;

FIGURE 16 is a perspective view of a modification of the seating unit; and

FIGURE 17 is a perspective view of various units of the vehicle in a fully dismantled condition.

Referring to the drawings in more detail, the present invention is particularly adapted to be embodied in a motor vehicle 10 suitable for being self-propelled along a road by a power or drive unit 12 while carrying one or more persons on a seating unit 14 and storing a cargo in a body unit 16. In order to facilitate handling and/or dismantling the vehicle 10, the vehicle is particularly adapted to permit the power or drive unit 12, the seating unit 14 and the body unit 16 to be separated into three separate units. Each of these units is preferably of a size and weight that is convenient and easy to handle as well as being convenient to store in a vehicle such as an automobile, airplane, boat, etc.

As may be seen by referring to the drawings, and particularly to FIGURES 1, 2, 13 and 14, the body unit 16 includes a plurality of sides 18, 20 and 22. When the body unit 16 is fully assembled, the sides 18, 20 and 22 may be arranged to form a configuration that will be convenient to ride on and at the same time will insure the body being very strong. In the present instance, by way of example, the sides 18, 20 and 22 form essentially a triangle having an apex 24 disposed at the front adjacent the drive unit 12 and a base disposed across the rear of the vehicle 10. The base of the triangle is formed by the side 22 opposite from the apex 24. The rear side 22 may include one or more structural members such as a pair of right angle members 26 and 28. In the present instance, these members 26 and 28 are disposed parallel to each other and adjacent the top and bottom of the side 22. The two members 26 and 28 extend transversely of the vehicle from one rear corner 30 to the other corner 32.

The rear side 22 may include short arms 38 and 40 at each end that projects forwardly from the corners 30 and 32 toward the apex 24 of the body. Each of these arms 38 and 40 may be constructed similar to the rear side so as to include an upper structural member 42 and a lower structural member 44 such as a right angle flange member. A sheet panel member 46 may be secured to the flange members 42 and 44 so as to close the space therebetween and also to carry a portion of the loads in the arms and thereby increase the strength.

A pair of road wheels 48 and 50 may be secured to the rear of the body unit 16 to thereby support the rear end of the vehicle 10. Although the wheels 48 and 50 may be secured in position by any desired means, in the present instance, they are secured to the rear side 22. More particularly, an axle 52 is provided that is disposed adjacent the lower structural member 28 so that the ends thereof project beyond the two arms 38 and 40. The axle 52 may be secured to one or more of the flange members in the base side 22 and/or in the arms 38 and 40 so that the road loads will be properly distributed through the body 16. The ends of the axle 52 may extend beyond the arms 38 and 40 just sufficiently for the wheels 48 and 50 to be rotatably mounted thereon adjacent to and immediately outboard of the arms 38 and 40.

The two lateral sides 18 and 20 in the present embodiment are secured to front ends of the arms 38 and 40. When the body unit 16 is in its asesmbled condition, the sides 18 and 20 will extend forwardly and be joined together at the apex 24 to thereby form a triangular structure. As previously stated, such a triangular configuration forms a very simple structure that is not only lightweight and very strong, but is also convenient to use and operate. Each of the sides 18 and 20 may be constructed substantially identical to each other and similar to the backside 22. More particularly, each side may include a plurality of rigid structural members 54 and 56 that may be joined end-to-end to form a top rail for the side. In addition, a set of rigid structural members 58, 60 and 62 may be provided that may be joined together to form a bottom rail for the side and a set of members 64 and 66 that form a reinforcement along the center of the side. The top members 54 and 56 may be in substantial alignment so that the top will be straight. The bottom members 58 and 60 may be arranged to be substantially horizontal while the member 62 slopes upward. The member 62 may join the member 66 at the apex 24. One or more sheet metal panels 67 and 69 may be secured to the structural members to thereby close the spaces between the reinforcing members and to carry at least a portion of the body loads.

To facilitate storage and/or handling of the body unit 16, it is desirable for each of the sides 18 and 20 to be divided into a plurality of sections 68 and 70. Each of these sections may have a length that is shorter than the space between the two arms 38 and 40 whereby the sections may be stored along the base side 22 and between the rear wheels 48 and 50. In the present instance, each side is divided into a front section 70 and a center section 68. The rear end of the center section 68 is attached to the front of the associated arm 38 or 40 by means of a plurality of hinges 72. These hinges 72 may be secured to the mating ends of the structural members 42 and 44 in the arms 38 and 40 and the structural members 54, 58 and 64 in the center section 68. The hinges 72 may be arranged to permit the sections 68 to fold inwardly against backside 22. The front end of the center section 68 and the rear end of the front section 70 may also be secured together by hinges 74. These hinges 74 may be secured to the mating ends of the structural members 54–56, 64–66 and 58 and 60. The hinges 74 are preferably arranged so that the section 70 may fold backwardly or outwardly against the section 68. It may thus be seen that the sections 68 and 70 may be folded back toward the side 22 so as to be disposed between the wheels 48 and 50. In order to facilitate this folding action, one of the arms 38 or 40 may be slightly shorter than the other arm so that one side will fit against the back side and the other side will be folded flat upon the first side.

When the front ends of the two sides 18 and 20 are joined together at the apex 24, an open space will be formed between the sides 18, 20 and 22. This space may be employed for cargo storage or any other desired purpose. In order to facilitate the use of this space, a triangular member 80 that has a triangular shape corresponding to the configuration of the body may be provided to fit between the lower edges of the sides 18, 20 and 22 and form a floor.

In the present instance, this floor member 80 has a rear edge secured to the bottom of the back side 22 and the floor member is flexible to permit the floor to be folded about the side 22. The edges of the floor 80 may extend along the sides 18 and 20 such that the edges will rest on and be supported by the structural members 58, 60 and 62.

Since the floor member 80 is highly flexible it may be desirable to reinforce the floor member by means of a plurality of reinforcing bars or tubes. These tubes 84 are attached to the floor 80 so as to be substantially parallel to the rear axle. This will reinforce the floor 80 and increase its load-bearing capabilities but will not materially interfere with the ability of the floor 80 to be folded about lines parallel to rear side 22. It has also been found desirable for the reinforcing tubes 84 to be somewhat longer than the widths of the body at the points where the tubes 84 are attached. The ends of the tubes will thus be free to project beyond the sides 18 and 20 and from a plurality of foot rests 86.

The front end or apex of the floor member 80 may include a fitting 88 such as a hook that may be secured to the apex 24 of the body when the floor 80 is disposed in its operative position. As previously stated, the floor 80 is flexible and the floor 80 is bendable along lines parallel to the back side 22. As a result, when the sections 68 and 70 of the sides 18 and 20 are folded back against the side 22, the bottom member 80 may be wrapped around the sides 18, 20 and 22. The hook fitting 88 may then be secured to a complementary fitting on the floor member 80 to thereby form a compact and easily handled unit.

The power or drive unit 12 for propelling the vehicle 10 along the road may be attached to the front of the body unit 16 adjacent the apex 24. The drive unit 12 includes a framework that is effective to support the weight of the front portion of the vehicle 10 and to carry an internal combustion engine 90 and related components. This frame may include a plurality of members 92 and 94 that are adapted to be disposed in generally vertical position. Although these members 92 and 94 may be of any suitable configuration, in the present instance, each member includes a tube having portions thereof disposed in side-by-side relation. A plurality of spacer or shelf member 96 may be attached to the frame members 92 and 94. These shelf members 96 may extend substantially horizontally across the space between the two sides 92 and 94 so as to retain them in a fixed spaced relation. This will maintain the two sides in the desired predetermined relation. The lower ends of the members 92 and 94 may project downwardly beyond the lower shelf members 96 may be attached to the frame members secured to the lower ends of the fork to extend transversely thereacross. The axle 97 may include end portions that project outwardly beyond the sides of the members 92 and 94 to thereby form an additional set of foot rests. A road wheel 98 may be rotatably mounted upon the axle 97 so as to be positioned in the space in the fork formed by the lower ends of the side members 92 and 94. If desired, this wheel may be similar to the rear wheels 48 and 50.

The upper ends of the frame members 92 and 94 may have a handle bar 100 rigidly secured thereto so as to form a structural portion of the framework. This handle bar 100 will not only retain the members 92 and 94 properly spaced, but will also extend beyond the side members so as to form a pair of hand grips 102. The hand grips 102 may be grasped by an operator for controlling the vehicle 10.

In order to secure the front or apex 24 of the body unit 16 to drive unit 12, at least some of the shelf members 96 may have pins 104 or similar devices disposed thereon. The pins 104 may project upwardly from the shelves 96 and be positioned in substantial alignment and coincident with the center line of the unit 14. The forward ends of each of the side rail members 56 and 62 may include an extension 106 that projects forwardly beyond the sheet metal panels 69. Each of these extensions 106 includes an opening 108 that is positioned at the apex 24 of the body 16. When the body 16 is assembled, all of these openings 108 will be aligned with each other substantially coincident with the apex 24. Each of these openings 108 is preferably just large enough to receive one of the pins 104.

It may thus be seen that the extensions 106 may be positioned so that a pin 104 will extend through its opening 108 while the extension 108 rests on one of the shelf members 96. The front ends of the structural members 56 and 62 will thus be secured together at the apex 24 and will be supported by the drive unit 12. In addition, it should be noted that since the round pins 104 may turn in the round holes 108, the drive unit 12 may be turned about the axis of the pins 104 relative to the body unit 16. Thus, the front wheel 98 will form a dirigible wheel for steering the vehicle 10.

The engine 90 for driving the vehicle 10 may be mounted on the frame members 92 and 94 for being drivingly connected to the front wheel 98. This motor may be of any suitable variety and enclosed in a cover 110. However, it has been found that a small, compact gasoline motor of the two cycle variety capable of producing on the order of 5 to 10 horsepower is well suited for this purpose. The motor 90 may have the output shaft thereof operatively connected to the wheel by means of any suitable drive train. The drive train may include a variable speed transmission or may include a direct drive with a clutch of the manual or centrifugal type. However, in the present instance, a so-called V-belt pulley 112 is keyed to the motor's drive shaft 114 so that a V-belt 116 may extend from the pulley 112 to a second pulley 118. The second pulley 118 is keyed to a shaft having a sprocket gear 120 thereon. The gear 120 may, in turn, be connected to a gear 122 attached to the front wheel 98 by means of a chain 124. An idler pulley 126 may be positioned to ride against the belt 116 so as to control the tension in the belt 116. This belt-tensioning pulley 126 may be connected to a foot pedal 128 or similar device so that the operator may manually adjust the tension in the belt 116. The pedal 128 may be employed as a clutch by reducing the belt tension to permit slippage or tightening the belt to insure a driving connection. By making one or more of the pulleys 112 and/or 118 of the variable diameter variety, the tension in the belt 116 may control the drive ratio. Thus, the pedal 128 will act as a clutch and transmission control. In addition, a brake may also be provided on the wheel that may be controlled by means of a foot pedal or a handle bar lever 130. One of the hand grips 102 may be manually rotatable so as to function as a throttle control for regulating the speed of the motor 90.

The seating unit 14 may be provided in order to carry one or more persons upon the vehicle. Although the seating section unit may be effective to carry the passengers in any desired configuration, in the embodiment of FIGURES 1 and 5 to 9, inclusive, the unit 14 is an elongated structure that is arranged to extend longitudinally of the vehicle 10. The front end of the unit 14 is supported adjacent the apex 24 while the rear end is supported adjacent the center of the back side 22. Thus, a group of people may be seated in a tandem fashion along the center line of the vehicle 10.

The present seating unit 14 includes a plurality of rigid members that are arranged to extend the length of the seat and form a frame for supporting persons seated thereon. More particularly, the seating unit 14 includes a front section 132 and a rear section 134 that may be secured together so as to permit the seating unit 14 to be dismantled. Each of the sections 132 and 134 includes one or more rigid members 136 or 137, respectively. Although these members 136 and 137 may be of any desired cross-section, they are preferably lightweight members such as a tube that is of adequate strength to carry any load present on the seat. The members 136 in the rear section 134 may be secured together by means of one or more plates or brackets 135 that are welded to the bottom of the members. The plate 135 will retain the members 136 spaced to form a rigid structure having a width substantially equal to the desired width of the seat. A mounting bracket 138 may be secured to the rear end of the members 136 or the plate 135 so as to be disposed in a substantially vertical position during use for carrying a license plate 140 and/or rear light 142.

The members 137 in the front section 132 may be secured together by means of one or more plates or brackets 144 that are welded across the bottom of the members 137. The brackets 144 preferably retain the members 137 spaced approximately the same as the members 136 so that the front section 132 will be substantially the same width as the rear section 134.

The two sections 132 and 134 are secured together by means that will permit the sections to be dismantled so as to be easily handled or assembled into a single rigid structure. Although any desired means may be employed in the present instance a hinge 133 is provided that connects the sections together whereby they may be easily folded back together. It has been found desirable for the hinge axis to be disposed adjacent the bottom side of the sections 132 and 134. Thus, when the two sections of the seat are folded back, the bottoms of the sections will face each other. However, when the seat is in its extended or assembled condition, the ends of the sections will mate and thereby prevent the sections bending beyond a straight line. In addition, a plurality of lips or projections 141 may extend beyond the ends of the members 137 and rest on the ends of the members 136 when the seat is assembled. This will further prevent the sections 132 and 134 being folded beyond a straight line and will further increase the load carrying capabilities of the seat unit 14. If desired, one or more resilient cushions 143 may be provided on top of the members 136 and 137 that will be effective to soften the ride of the passengers.

The front end of the section 132 may include a rigid member 146 that extends forwardly for securing the seating structure to the body and drive units 12 and 16, respectively. This member 146 may be secured to the members 137 or to the front bracket 144 or it may be an integral part of the bracket. This member 146 extends forwardly from the front unit 132 and rests on the tops of the members 106 and/or on one of the shelves 96 and is supported thereby. The member 146 may include an opening 148 (FIGURE 12) through which the upper pin 104 may project. An easily releasable latch 150 (FIGURE 12) may be provided for retaining the member 146 secured in position on the pin 104. In the present instance, this latch 150 includes a spring that is secured to the member 146 so as to ride in an annular groove 154 in the pin 104. This will releasably lock the members 106 and 146 onto the pin 104 for being readily assembled and disassembled without requiring any tools. At the same time, it will not interfere with any turning motion of the pin 104 in the opening 148.

A mounting structure 152 may be provided for supporting the rear end of the seat unit 14. In the present instance, this mounting structure 152 is secured to the upper structural member 26 on the back side 22. The structure 152 may include a pair of substantially vertical supports 155 that are secured to the member 22 by means of a hinge 156. This permits the structure 152 to be erected into a vertical position or folded down against the side 22 as shown in FIGURES 13 and 14. A cross-piece 158 may be secured to the upper ends of the supports 154 so as to extend substantially horizontally thereacross. If it is desired to provide a resilient support for the seat, each of the supports 154 may comprise a pair of telescoping tubular members that have springs inside thereof. This will permit the cross-piece 158 to be resiliently deflected.

The plate or bracket 135 on the bottom of the members 136 may include fastening means for attaching the section 134 to the cross-piece 158. The present fastening means includes a guide pin 160 that projects downwardly from the plate 135 so as to pass through an opening in the center of the cross-piece 158. In addition, a plurality of spring clips 162 may be provided on the plate 135 so as to fit over and grip the cross-piece 158 and retain the section 134 securely attached to the cross-piece.

If desired, a battery 170 (FIGURE 1) may be mounted in the front of the section 132 so that electrical conductors 174 may interconnect the battery 170 with the electrical equipment in the motor 90 and the various accessories such as the headlight 172 and the taillight 142. In addition, a gas tank may be mounted in the seating unit 14 or on the power unit 12 for supplying fuel to the motor 90.

A vehicle 10 as seen in FIGURE 1 is fully assembed and in condition for traveling and carrying one or more passengers. To utilize the vehicle 10, the operator and one or more passengers may be seated on the seating unit 14 so as to straddle the seat in a tandem manner and place their feet on the foot rests 86 and/or the ends of the axle 97. The operator may then grasp the hand grips 102 and steer the vehicle by turning the drive unit 12 relative to the body unit 16. At the same time, the throttle, brake and/or pedal may be manipulated so as to cause the vehicle 10 to start and stop, etc.

In the event the vehicle is not being operated and it is desired to dismantle it to facilitate its being stored or carried in another vehicle such as an airplane 164, the power unit 12, seating unit 14 and the body unit 16 may all be separated. In order to do this, the operator may deflect the spring so as to release the latch 150 and lift the extension 146 from the pin 104. As soon as the end of the extension 146 is clear of the pin 104, the front of the seating unit 14 will be disconnected. Following this, the entire unit 14 may be swung to rotate about the guide pin 160 until the clips 162 are free of the cross-piece 158. At this point, the seating unit 14 will be entirely disconnected and free to be lifted clear of the vehicle 10. The seating unit 14 may then be folded about the hinge 133 in the midde to place the sections 132 and 134 close together. The seating unit 14 will then form a small, compact, lightweight bundle that is easy to handle and store. Following this, the members 106 on the front ends of the sides 18 and 20 may be lifted from the shelves 96 and separated from the pins 104. At this point, the drive or power unit 12 will be separated from the body unit 16. The power unit 12 will thus form a separate unit that is small and compact, easily handled, and transported similar to the seat section 14.

The sides 18 and 20 of the body unit 16 may then be swung outwardly to open up the space therebetween far enough to permit the floor member 80 to be disconnected. When the members 84 are separated enough to permit the foot rest portions 86 to be removed from the openings, the floor member 80 will be free to drop to the ground. The locks 166 may then be released to permit the sections 68 and 70 to be folded. The side 18 or 20 which is connected to the shortest arm 38 or 40 may then be folded to place the sections 68 and 70 back-to-back and then folded back toward the side 22. Following this, the other side connected to the longer arm may then be folded upon itself and back against the first folded side. This will place both sides 18 and 20 of the body in their folded positions adjacent the side 22 and between the two wheels 48 and 50. Following this, the flexible floor member 80 may be wrapped around the folded assembly and the hook 88 attached to the eye 168. The entire body unit 16 will then be completely contained within a small and easily handled bundle similar to the drive unit 12 and seating unit 14 whereby the entire vehicle will be three easily handled bundles suitable for storage or transporting.

If it is desired to reassemble the vehicle, the hook 88 may be disconnected from the eye 168 and the floor member 88 unwrapped from the folded body and laid on the ground. The two sides 18 and 20 may then be folded out from the back side 22. Each side may then have the sections 68 and 70 aligned and the locks 166 set to retain each side 18 and 20 substantially straight. The foot rest portions 86 of the reinforcing members 84 may then be inserted through the openings in the bottom of the sides 18 and 20 and the members 106 at the ends of the sides 18 and 20 brought together at the apex 24. The drive unit 12 may then be disposed adjacent the apex 24 and the openings 108 passed over the pins 104 so that the members 106 will rest on the shelves 96. The seating unit 14 may be unfolded into its extended position and the guide pin 160 inserted through the opening in the cross-piece 158. The seating unit 14 is then swung about the axis of the pin 106 and the extension 146 dropped over the upper pin 104. The spring latch 150 will lock the front end of the seat in position and the clips 162 will lock the rear of the seat in position. The vehicle 10 is thus completely re-assembled and again fully ready for use.

As an alternative, the embodiment of FIGURE 16 may be employed. In this embodiment, the seating unit 182 is arranged to carry the passengers partially in tandem and partially side-by-side. More particularly, the seating unit 182 includes a first or front section 184 and a second or rear section 186.

The front section 184 may include one or more rigid members 188 that are similar to the members 136 and 137. The members 188 may be welded together by one or more plates or brackets 190 to thereby form a framework having substantially the same width as the section 184. One of these brackets 190 may be secured to the members 188 so as to project forwardly therefrom to form a support that will rest on the tops of the members 106 and/or one of the shelves 96 so that the forward portion of the unit 182 will be carried thereby in a substantially longitudinal direction. The bracket 190 may include an opening 192 for receiving the upper pin 104 and permitting the drive unit to turn. A suitable releasable latch may be provided for retaining the member 106 and the bracket 190 in position on the shelves 96.

The rear section 186 may include one or two members similar to members 188 that may be secured together to form a framework that is substantially the same width and length as the first section 184. A mounting structure 194 may be provided for resiliently supporting the section 186. The present structure 194 includes a plurality of substantially vertical supports 196 that are secured to the member 22 by means of a hinge 198 so that the structure 194 may be erected into a vertical position or folded down against the side 22. A cross piece may be secured to the upper ends of the supports 196 so as to extend transversely across the vehicle 10. The cross piece may be secured to the bottom of the section 186 by any suitable means for releasably supporting the section in a transverse position.

Fastening means may be provided in the middle of the rear section 186 for attachment to the rear of the front section 184. This will permit the two sections 184 and 186 to be releasably secured together in a generally "T"

shaped configuration. Resilient cushions may be provided for the passengers to sit on. In addition, one or more collapsible backrests may be provided if so desired. Thus the operator may sit on the front section 184 while one passenger sits in the center of the rear section 186 immediately behind the operator. In addition, one or more passengers may ride on the ends of the section 186 in side-by-side positions.

To store the seating unit 182, the front and rear sections 184 and 186 may be detached from the vehicle 10 and then detached from each other to form two separate bundles that will have lengths that are no longer than the length of the body unit 16.

It may thus be seen that a vehicle has been provided that may be readily disassembled or assembled without the use of any tools. When the vehicle is in a disassembled condition, it will comprise three separate bundles that may be easily handled for storage and/or transporting. When it is fully assembled, the vehicle will be capable of travelling at high rates of speed and carry substantial loads.

Although only a limited number of embodiments of the vehicle have been disclosed, it will be readily apparent to persons skilled in the art that numerous changes and modifications may be made thereto without departing from the spirit of the invention. Accordingly, the foregoing drawings and description thereof are for illustrative purposes only and do not in any way limit the invention which is defined only by the claims that follow.

What is claimed is:

1. A body structure for use in a vehicle having a pair of road wheels adjacent one end thereof, comprising the combination of:
    a pair of lateral sides that may be positioned to extend longitudinally of said vehicle between the front and rear of said vehicle and carry at least a portion of the load on said vehicle,
    a third side that is disposed between the ends of said lateral sides and said pair of wheels so as to extend transversely of said vehicle adjacent one end of said vehicle,
    hinge means interconnecting said ends of said lateral sides with the opposite ends of the third side to permit said lateral sides to be folded about the axes of said hinge means into the space between said wheels and adjacent said third side,
    a sheet metal floor secured to said third side so as to be positioned in the space between said sides, said sheet metal floor being flexible to wrap around said sides when said lateral sides are folded adjacent said third side.

2. A body structure for use in a vehicle having a pair of road wheels at one end thereof, said body structure comprising the combination of:
    a pair of lateral sides that may be positioned to extend longitudinally of said structure so that the first ends thereof may be joined together at an apex,
    a third side that is disposed between the second ends of said lateral sides and extends transversely of said structure whereby said sides form a triangle having a base positioned between said pair of wheels and remote from said apex,
    hinge means to permit said lateral sides to be folded away from said first position and into a second position adjacent said third side and in the space between said wheels, and
    a triangular floor member having the base thereof secured to said third side and an apex for being secured to the apex at the junction of said sides when they are in the first position, said floor member being bendable to wrap around said sides when said lateral sides are in said second position.

3. A body structure for use in a vehicle having a pair of road wheels at one end thereof, said body structure comprising the combination of:
    a pair of lateral sides that may be positioned to extend longitudinally of said structure so that the first ends thereof may be joined together at an apex,
    a third side that is disposed between the second ends of said lateral sides and extends transversely of said structure whereby said sides form a triangle having a base positioned between said pair of wheels and remote from said apex,
    hinge means to permit said lateral sides to be folded away from said first position and into a second position adjacent said third side and in the space between said wheels, and
    a triangular sheet metal member having the base thereof secured to said third side by means of a hinge, said sheet metal member being adapted to be secured to said lateral sides when they are in said first position to form a floor for said body structure and being bendable about lines parallel to the axis of said last hinge to be wrappable about said sides when said lateral sides are in said second position.

4. A body structure for use in a vehicle having a pair of rear road wheels at the rear end thereof and a power unit at the front end which includes a front road wheel for propelling and steering said vehicle, said body structure comprising the combination of:
    a pair of vertical panels which form lateral sides that may be positioned to extend longitudinally of said vehicle and have the front ends thereof joined together at an apex for being pivotally attached to said power unit,
    a third side that is disposed between said rear wheels and the rear ends of said lateral sides,
    hinge means connecting the rear ends of said lateral sides to said third side to form a triangle having a base positioned between said pair of rear wheels and remote from said apex,
    hinge means disposed in each of said lateral sides near the middle thereof to permit each of said lateral sides to be folded upon itself and into a second position adjacent said third side and in the space between said wheels, and
    a sheet metal floor secured to said third side so as to be secured to said lateral sides to form a floor for said triangle when said lateral sides are in said first position and to wrap around said sides when said lateral sides are in said second position.

5. A vehicle comprising the combination of:
    a body structure having an inarticulate rear side and a pair of articulated lateral sides, said lateral sides being hingedly connected to the opposite ends of the rear side for folding and unfolding movement between retracted positions adjacent the rear side and extended converging positions to form with the rear side a triangle having an apex adjacent the front of said structure and a base adjacent the rear of said structure,
    an axle secured to said body structure adjacent said base to extend transversely of the body structure and project beyond the lateral sides,
    a pair of rear wheels mounted on the opposite ends of the axle for supporting the rear of the vehicle,
    a power unit releasably secured to said body adjacent said apex for holding the forward ends of the sides together, said unit being arranged for turning about a substantially vertical axis, said power unit including a dirigible road wheel for propelling and steering said vehicle, and
    an elongated seating unit having a front end secured to the body structure adjacent the apex to be supported thereby and a rear end secured to the body structure adjacent the rear side so as to extend longitudinally of the vehicle so that the weight of an operator riding on said vehicle will be distributed between the power unit and the rear side.

(References on following page)

References Cited by the Examiner

UNITED STATES PATENTS

| | | | |
|---|---|---|---|
| 860,251 | 7/07 | Schmoele | 180—13 |
| 1,571,236 | 2/36 | Dieckmann | 180—26 |
| 1,601,917 | 10/26 | Kinvall | 280—42 |
| 2,494,199 | 1/50 | Provitola et al. | 280—36 |
| 2,503,106 | 7/50 | Fritz | 180—31 |
| 2,563,995 | 8/51 | East | 280—36 |
| 2,564,939 | 8/51 | Weast | 180—26 |
| 2,649,162 | 8/53 | Wooldridge et al. | 180—13 |
| 2,749,997 | 6/56 | Deslippe | 180—25 |
| 3,079,172 | 2/63 | Burwell | 180—35 |
| 3,096,841 | 7/63 | May | 180—31 |

FOREIGN PATENTS

| | | |
|---|---|---|
| 113,030 | 7/27 | Austria. |
| 198,136 | 6/58 | Austria. |
| 443,771 | 11/25 | Germany. |

BENJAMIN HERSH, *Primary Examiner.*

A. HARRY LEVY, KENNETH H. BETTS, MILTON BUCHLER, *Examiners.*